(12) United States Patent
Li et al.

(10) Patent No.: US 10,380,553 B2
(45) Date of Patent: *Aug. 13, 2019

(54) ENTITY-AWARE FEATURES FOR PERSONALIZED JOB SEARCH RANKING

(71) Applicant: Microsoft Technology Licensing, LLC, Redmond, WA (US)

(72) Inventors: Jia Li, Chicago, IL (US); Dhruv Arya, Sunnyvale, CA (US); Shakti Dhirendraji Sinha, Sunnyvale, CA (US); Viet Thuc Ha, Milpitas, CA (US); Deepak Agarwal, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/488,099

(22) Filed: Apr. 14, 2017

(65) Prior Publication Data

US 2017/0221008 A1    Aug. 3, 2017

Related U.S. Application Data

(63) Continuation of application No. 14/975,604, filed on Dec. 18, 2015.

(51) Int. Cl.
*G06Q 10/10* (2012.01)
*G06Q 10/06* (2012.01)
(Continued)

(52) U.S. Cl.
CPC ....... *G06Q 10/1053* (2013.01); *G06F 16/951* (2019.01); *G06N 5/04* (2013.01);
(Continued)

(58) Field of Classification Search
CPC .. G06Q 10/105; G06Q 10/1053; G06Q 50/01; G06F 16/951; G06N 5/04; H04L 67/306
(Continued)

(56) References Cited

U.S. PATENT DOCUMENTS 8,175,726 B2    5/2012 Herbrich et al.
9,639,827 B1    5/2017 Li et al.
(Continued)

OTHER PUBLICATIONS

"U.S. Appl. No. 14/975,616, Final Office Action dated Jun. 27, 2017", 22 pgs.
(Continued)

*Primary Examiner* — Jonathan P Ouellette
(74) *Attorney, Agent, or Firm* — Schwegman Lundberg & Woessner, P.A.

(57) ABSTRACT

In an example, a plurality of member profiles in a social networking service are obtained, each member profile identifying a member and listing one or more skills the corresponding member has explicitly added to the member profile, the one or more skills indicating a proficiency by the member in the corresponding skill. A members-skills matrix is formed, wherein each cell in the matrix is assigned a value based on whether the corresponding member has the corresponding skill. The dot product of the members matrix and the skills matrix is then computed and used to identify one or more latent skills of a first member of the social networking service. Then a first digitally stored member profile is augmented with the one or more latent skills by combining the one or more latent skills with explicit skills for purposes of one or more searches that utilize member skills as an input variable.

20 Claims, 14 Drawing Sheets

(51) Int. Cl.
  *G06Q 30/08* (2012.01)
  *G06Q 30/02* (2012.01)
  *G06Q 10/00* (2012.01)
  *G06Q 50/00* (2012.01)
  *G06F 16/951* (2019.01)
  *G06N 5/04* (2006.01)
  *H04L 29/08* (2006.01)

(52) U.S. Cl.
  CPC ........... *G06Q 50/01* (2013.01); *H04L 67/306* (2013.01); *G06Q 10/105* (2013.01)

(58) Field of Classification Search
  USPC .......................... 705/1.1–912, 319, 320, 321
  See application file for complete search history.

(56) References Cited

U.S. PATENT DOCUMENTS

| | | |
|---|---|---|
| 2006/0206517 A1 | 9/2006 | Hyder et al. |
| 2008/0114750 A1 | 5/2008 | Saxena et al. |
| 2011/0035379 A1 | 2/2011 | Chen et al. |
| 2011/0264511 A1 | 10/2011 | Zhang |
| 2012/0011117 A1 | 1/2012 | Tong et al. |
| 2012/0030152 A1 | 2/2012 | Pueyo et al. |
| 2012/0209831 A1 | 8/2012 | Rehman et al. |
| 2014/0214711 A1 | 7/2014 | Filstein |
| 2014/0272914 A1 | 9/2014 | Baraniuk et al. |
| 2014/0279727 A1 | 9/2014 | Baraniuk et al. |
| 2014/0280133 A1 | 9/2014 | Dulitz |
| 2014/0317078 A1 | 10/2014 | Gallagher et al. |
| 2017/0177579 A1 | 6/2017 | Li et al. |

OTHER PUBLICATIONS

"U.S. Appl. No. 14/975,604, Non Final Office Action dated Aug. 10, 2016", 8 pgs.

"U.S. Appl. No. 14/975,604, Notice of Allowance dated Dec. 22, 2016", 7 pgs.

"U.S. Appl. No. 14/975,604, Response filed Nov. 10, 2016 to Non Final Office Action dated Aug. 10, 2016", 10 pgs.

"U.S. Appl. No. 14/975,616, Examiner Interview Summary dated Jun. 24, 2016", 3 pgs.

"U.S. Appl. No. 14/975,616, Final Office Action dated Aug. 30, 2016", 21 pgs.

"U.S. Appl. No. 14/975,616, Non Final Office Action dated Jan. 11, 2017", 27 pgs.

"U.S. Appl. No. 14/975,616, Non Final Office Action dated Mar. 25, 2016", 19 pgs.

"U.S. Appl. No. 14/975,616, Response filed Jun. 27, 2016 to Non Final Office Action dated Mar. 25, 2016", 19 pgs.

"U.S. Appl. No. 14/975,616, Response filed Nov. 30, 2016 to Final Office Action dated Aug. 30, 2016", 13 pgs.

"U.S. Appl. No. 14/975,616, Response filed Apr. 11, 2017 to Non Final Office Action dated Jan. 11, 2017", 14 pgs.

"U.S. Appl. No. 14/975,616, Reply Brief filed Jun. 13, 2018", 7 pgs.

"U.S. Appl. No. 14/975,616, Advisory Action dated Nov. 3, 2017", 3 pgs.

"U.S. Appl. No. 14/975,616, Appeal Brief filed Jan. 29, 2018", 18 pgs.

"U.S. Appl. No. 14/975,616, Examiner's Answer dated Apr. 13, 2018", 15 pgs.

"U.S. Appl. No. 14/975,616, Response filed Aug. 28, 2017 to Final Office Action dated Jun. 27, 2017", 13 pgs.

400 — 404  402

Software Engineer, University Grad
Company XYZ - San Francisco Bay Area
Posted 15 days ago                                406

[Apply now]  [Save]                               408

| | |
|---|---|
| Experience<br>Not Applicable | Industry<br>Information Technology and Services |
| Job function<br>Information Technology | Job ID<br>70702863 |
| Employment type<br>Full-time | |

Other Details

About this job

Job description

Company XYZ Engineers work on all product teams from Product1 and Product2 to Online Marketing. Software Engineers at Company XYZ are researchers and developers who strive to create and implement complex computer science solutions. As a Software Engineer, you will work on our core products and services as well as those who support critical functions of our engineering operations. Depending on your interest, background and experience, you will be working in either the Digital Marketing, Digital Media or Corporate Technology Business Unit.

Desired Skills and Experience    410

- Working towards a BS or MS degree from an accredited university or college
- Computer Science, Computer Engineering, Electrical Engineering or similar technical majors with programming experience
- Strong Technical background with analytical and problem solving skills
- Ability to work with ambiguity and change
- Ability to work on diverse teams
- Experience in any of the following Computer Languages: C, C++, Java, ActionScript, Flex Python or Perl
- Past internship experience a plus

*FIG. 4*

ENTITY-AWARE FEATURES FOR PERSONALIZED JOB SEARCH RANKING

CROSS-REFERENCE TO RELATED APPLICATIONS

This application is a continuation of prior application Ser. No. 14/975,604, filed on Dec. 18, 2015, which is incorporated by reference herein in its entirety.

TECHNICAL FIELD

The present disclosure generally relates to computer technology for solving technical challenges in electronic communications. More specifically, the present disclosure relates to the ranking of job search results using entity-aware features.

BACKGROUND

In recent years it has become more and more prevalent for job hunters to utilize the Internet to perform their job search, typically by performing searches on job listings posted online by hiring companies and/or recruiters. Historically, these job searches have relied solely on text-based features. Specifically, traditional informational retrieval systems, and particularly web search engines, focus on keyword matching. In this search paradigm, users typically input their information needs as a set of keywords, and the search engines match the keywords with documents using some additional signals, such as document popularity (e.g., document historical click through rate (CTR), PageRank, etc.) to find relevant documents. While this paradigm works well for general web searches, it does not work well for job searches where often the keywords specified by a user are not necessarily intended to locate documents containing those keywords but rather are intended to locate documents that have some other correlation to the keywords. Additionally, job search queries tend to be overbroad as job titles often are not precise enough to specifically define what job skills or requirements are necessary to perform the underlying job.

For example, in a job search, a user could issue a query "software engineer Cambridge CompanyXYZ." Using a purely keyword-based approach, the only job postings returned would be those having "software engineer" "Cambridge" and "Company xyz" in the document. This would not return what might be other relevant job posting results, such as results where "Software programmer" was used to define the job rather than "software engineer." results where "CompanyXYZ" is not mentioned in the job posting but the job posting itself was created and posted by CompanyXYZ, results for jobs for a subsidiary of CompanyXYZ, and results for jobs within a short distance to Cambridge but not actually in Cambridge. Additionally, false positives may be presented in that results may be returned for software engineer jobs that require a set of skills much different than those of the user or that the user is interested in (due to the fact that "software engineer" can mean so many different things) or for jobs that are in Cambridge, England when the user really wants jobs in Cambridge, Mass.

Semantic search, on the other hand, represents information needs and documents in a structured way and semantically matches the information needs with the documents. A challenge with semantic search is that it is typically difficult for a user to describe his or her information need in a semantic representation. Moreover, semantic search is often restricted by concepts and relations predefined in a knowledge base. Thus, it does not scale well to open and dynamic document sets, such as those found on the web.

BRIEF DESCRIPTION OF THE DRAWINGS

Some embodiments of the technology are illustrated, by way of example and not limitation, in the figures of the accompanying drawings.

FIG. 4 is a screen capture illustrating a job posting, in accordance with an example embodiment.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a solution is provided that bridges keyword-based searching and semantic searching to make an online job search produce more relevant and personalized results, while still making it simple for the user to use and ensuring efficiency at the web scale. From a user perspective, he or she is still able to describe their information needs in a free-text form. Given user queries, entities about the job results are extracted and standardized. These entities may include attributes such as job title, company, skills, and location. On the document side, standardized entities mentioned in job descriptions are leveraged and included in the search index. Based on the standardization information, entity-aware features are constructed, matching queries and documents as well as features capturing global document qualities (query-independent).

Moreover, even when a query is perfectly understood, the query is often not enough to represent the user's information need. To overcome this, standardized information, such as skills, in member profiles in a social networking service and job descriptions are leveraged to capture searcher-job expertise homophily. For instance, if the searcher is a machine learning expert, he or she will be more likely to apply for software engineer jobs focusing on the machine learning domain rather than on software system infrastructure. Thus, the ranking function can rank the former higher than the latter. These features are combined by applying learning to ranking techniques to automatically learn a personalized search ranking function.

Figure 1:
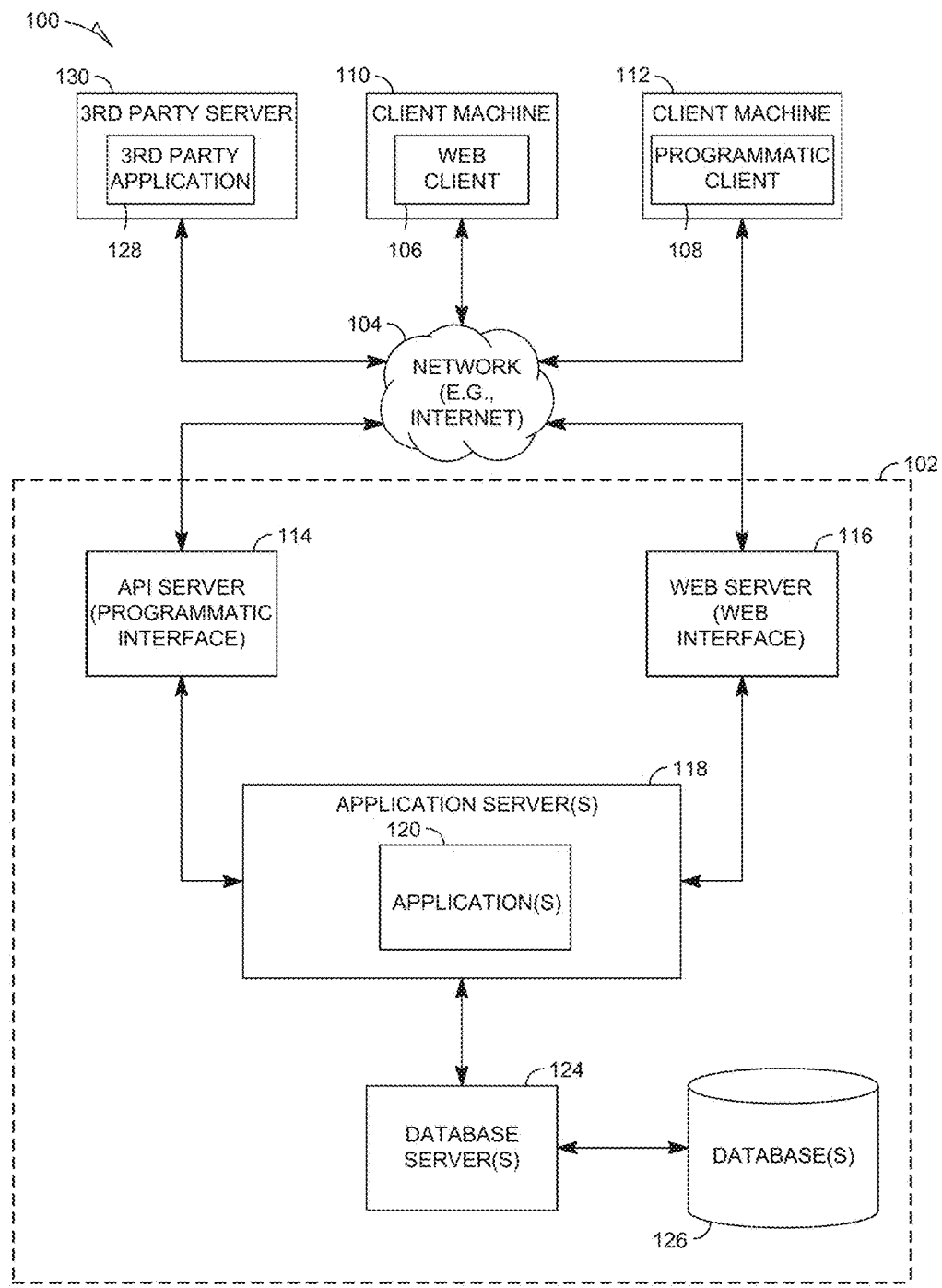
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112, and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
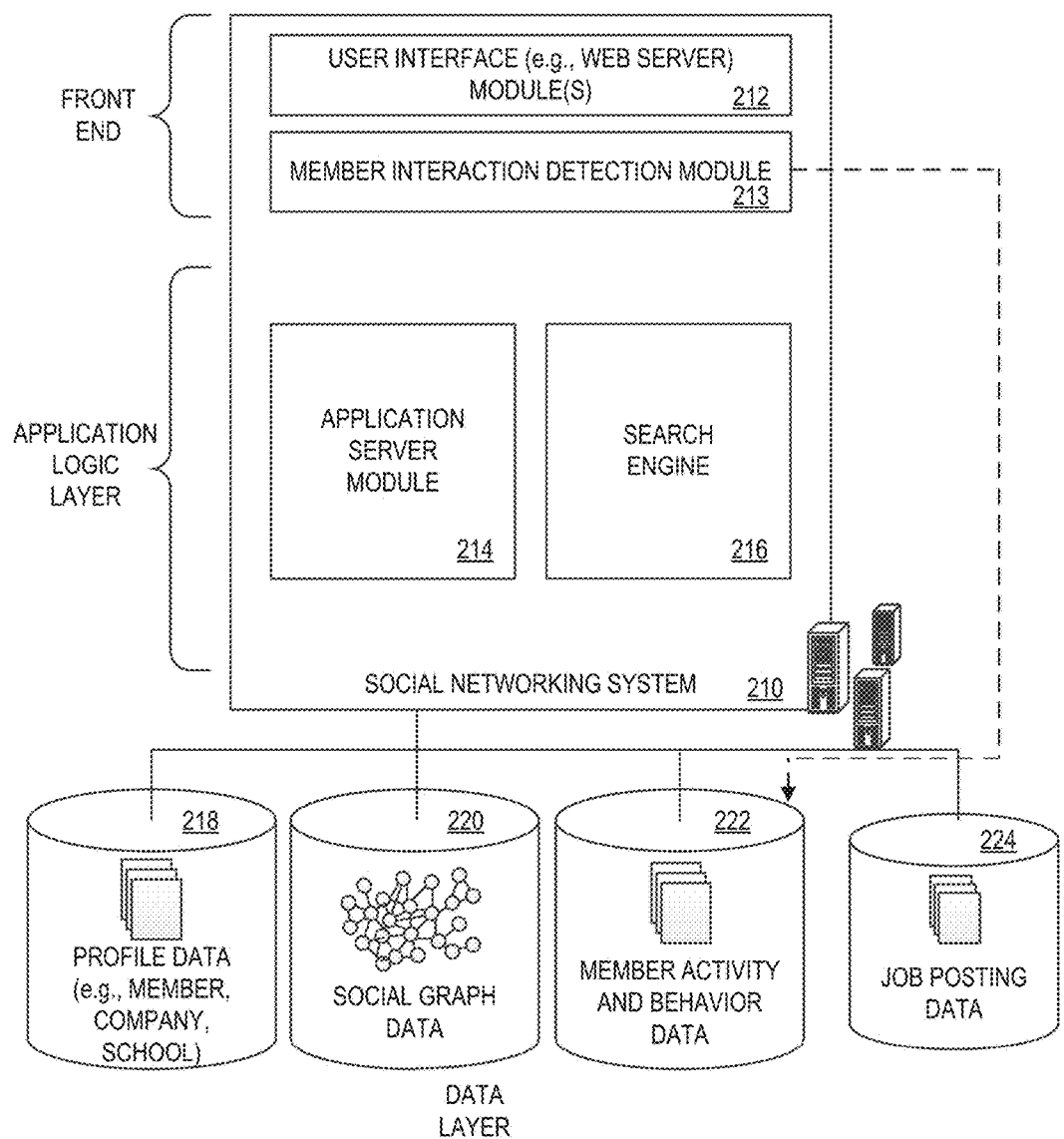
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other objects, are stored and maintained within a social graph in a social graph database 220.

As members interact with the various applications 120, services, and content made available via the social networking service, the members' interactions and behavior (e.g., content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the organization operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Companies, recruiters, or other individuals or organizations may then post job postings to the social networking system. These job postings may be stored in job posting database 224 and may be available to members of the social networking service system 210 for search, perusal, and application.

As mentioned above, when a user issues a query like "software engineer Cambridge Company XYZ" to the job posting database 2214, the user implicitly links the keywords to different entity types such as title, location, and company, and expects the results to with the keywords in terms of the structure he or she has in mind, but from a technical viewpoint this can be a challenge to accomplish. In an example embodiment, documents are indexed in a structured way. At searching time, the user query is segmented and linked to one of the typed entities used in the document index. Then, various features are constructed matching typed entities mentioned in the query with the corresponding ones in the documents.

To aid job seekers in searching and discovering jobs, in an example embodiment, a search index is built on some of the key attributes of the job. Jobs may be thought of as being structured on several key attributes, including job title, company, location, industry, and skills. When a job is posted to the system, a standardizer may be used to extract standardized entities from the job posting document. The extracted entities are based on curated dictionaries built over time from member profiles. The standardizer is engineered through multiple iterations to understand what parts of the job posting are critical for different entities. The standardized job posting is then indexed and becomes searchable on both the entities as well as the free text as entered.

Figure 3:
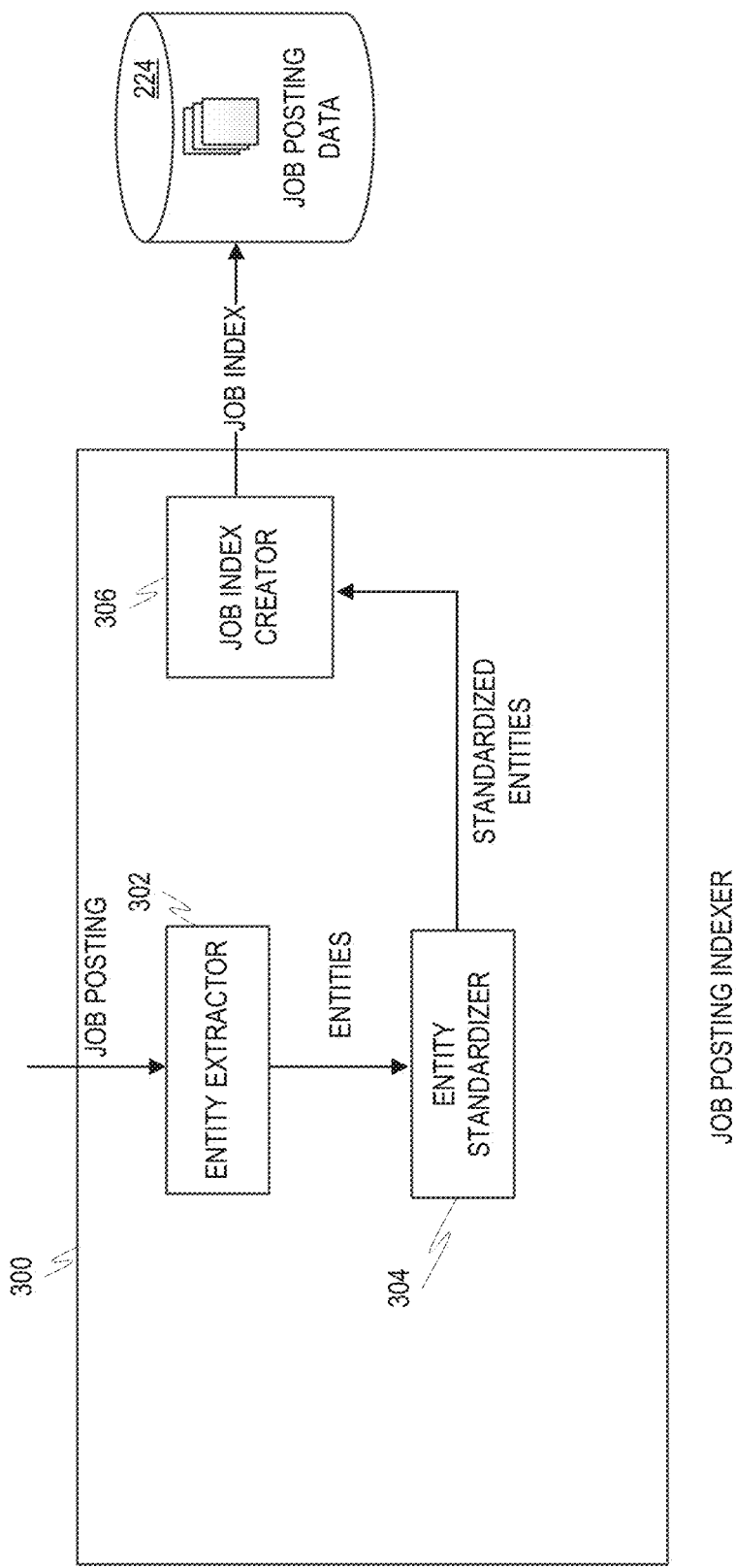
FIG. 3 is a block diagram illustrating a job posting indexer, in accordance with an example embodiment.

FIG. 3 is a block diagram illustrating a job posting indexer 300, in accordance with an example embodiment. The job posting indexer 300 may be located inside the application server module 214 of FIG. 2. The job posting indexer 300 may include an entity extractor 302, an entity standardizer 304, and a job index creator 306. The entity extractor 302 identifies entities within a job posting that match a set of predefined entities and extracts those entities from the job posting. The predefined entities may be specified by an administrator and the algorithm used by the entity extractor 302 to identify those features in a job posting may be an algorithm trained through machine learning, as will be described in more detail below. The entity standardizer 304 then standardizes the extracted entities so that entities that actually mean the same thing but are worded differently are treated the same. Thus, "software engineer," "software programmer," "software engineering." and the like may all be standardized to "software engineer." The normalized extracted entities from the job posting are then indexed by the job index creator 306 inside job posting database 224.

FIG. 4 is a screen capture illustrating a job posting 400, in accordance with an example embodiment. As described above, the entity extractor 302 may be programmed to look for several particular entities, including job title 402, company 404, location 406, industry 408, and skills 410 and extract them from the job posting.

Figure 5:
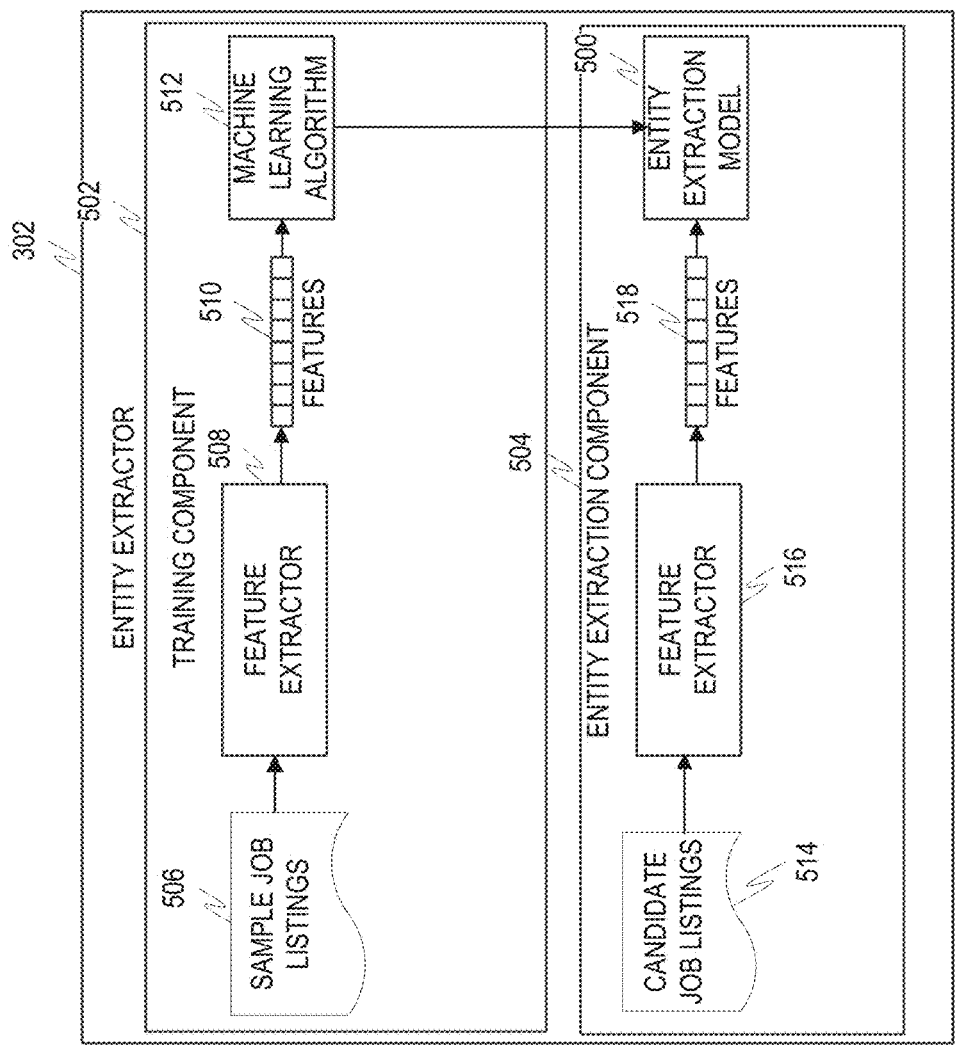
FIG. 5 is a block diagram illustrating an entity extractor, in accordance with an example embodiment.

FIG. 5 is a block diagram illustrating an entity extractor 302, in accordance with an example embodiment. The entity extractor 302 may utilize machine learning processes to arrive at entity extraction model 500 used to extract entities from job postings. The entity extractor may comprise a training component 502 and an entity extraction component 504. The training component feeds sample job listings 506 into a feature extractor 508 that extracts one or more features 510 for the job listings 506. These features 510 are measurements useful in differentiating entities from one another and entities from non-entity information. For example, the features 510 may include, for each unit of text in the job listing, a location of the unit of text with respect to the job listing (because, for example, the job title entity may typically be located somewhere near the top of the job listing). The features 510 may also include, for example, metadata accompanying a unit of text, as well as terms surrounding the unit of text (also known as context). The features 510 are then fed into a machine learning algorithm 512, which acts to interpret the features as well as one or more labels provided by human administrators to learn how to identify which features of a unit of text are relevant to determining to which entity type the unit of text may correspond. The machine learning algorithm 512 produces the entity extraction model 500. In the entity extraction component 504, candidate job listings 514 are fed to a feature extractor 516 that extracts one or more features 518 from the candidate job listings 414. In an example embodiment, features 518 are identical to the features 510, although the values for the features will of course vary based on the job listings input.

Figure 6:
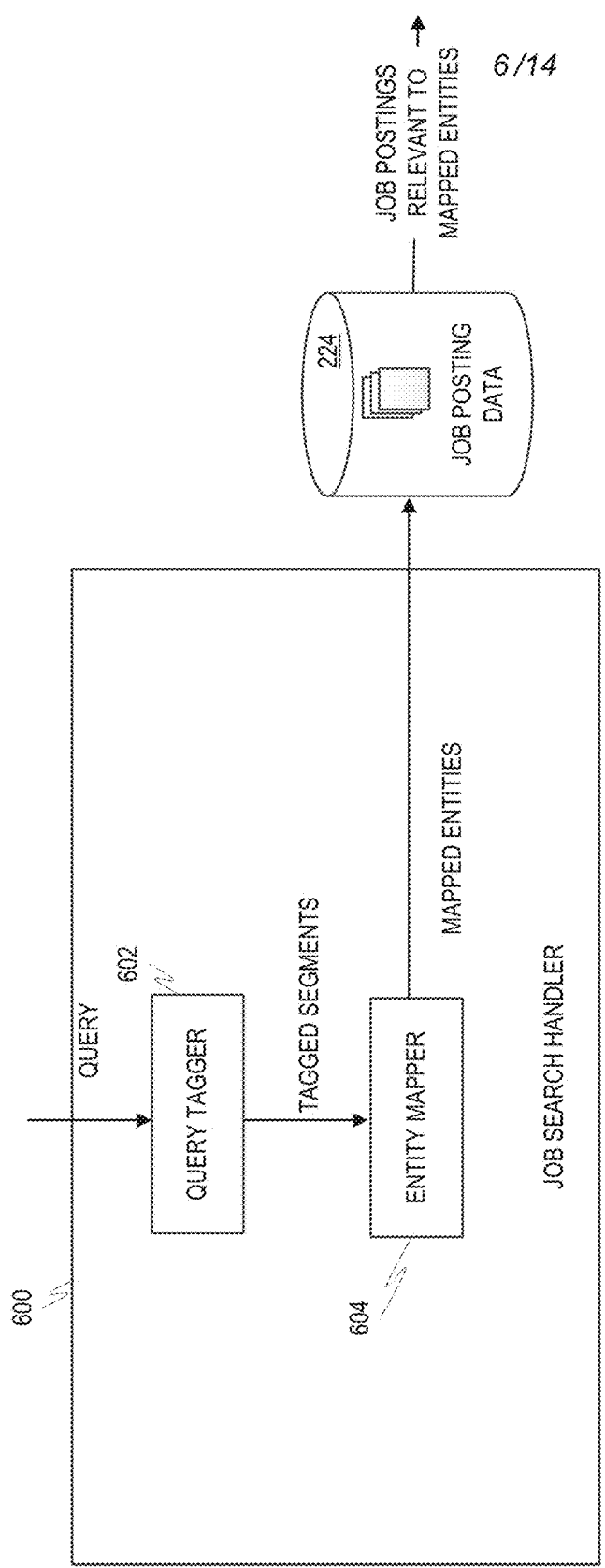
FIG. 6 is a block diagram illustrating a job search handler, in accordance with an example embodiment.

FIG. 6 is a block diagram illustrating a job search handler 600, in accordance with an example embodiment. The job search handler 600 may be located inside the application server module 214 of FIG. 2. When a searcher enters a query, a query tagger 602 is employed to segment the query and tag the segments into entity types that are important to the job search domain. In an example embodiment, these important entity types match the predetermined entities described above with respect to FIG. 3. Thus, these important entity types may include job title, company, location, industry, and skills. Thus, for example, the search query "software engineer Cambridge CompanyXYZ" may be segmented into "software engineer," "Cambridge," and "CompanyXYZ." "Software engineer" may be tagged as the type "job title," "Cambridge" may be tagged as the type "location," and "Company XYZ" may be tagged as the type "company."

The next step is to map the segments into specific entities. An entity mapper 604 may match the segments against a dictionary of corresponding types. Some segments may be ambiguous—Cambridge, for example, may refer to Cambridge, Mass. or Cambridge, England. A profile extracted for the searcher may be used to resolve ambiguities in a personalized way. For example, if the searcher is currently residing in the United States, the entity mapper 604 will be more likely to map Cambridge to Cambridge, Mass. than Cambridge, England. Likewise, the skills of the searcher (as denoted in the searcher's member profile) can be used to resolve a particularly ambiguous job title (e.g., "engineer" refers to "Software engineer" because the searcher has many software-related skills as opposed to a "structural engineer," of which the searcher has no related skills).

Given typed entities mentioned in user queries and in job posting documents, entity-aware features are then constructed to capture the semantic similarity between the queries and the job posting documents. In particular, entities in the queries are matched with entities of the same types in the job posting documents. For example, the title entity of "software engineer" from a query is matched with the title entity in each job posting document. Similarly, the company entity of "CompanyXYZ" from the query is matched with the company entity in each job posting document. There are two types of matching: hard matching and soft matching. Hard matching determines whether the two entities (one in the query and one in the job posting document) have the same identifier. Notably, hard matching is still able to capture synonymy relationships amongst different textual forms of the same entities, e.g. "software engineer" and "software developer").

In soft matching, semantic similarity between two different but related standardized entities are considered, such as between "software engineer" and "software architect" or between the skills of "information retrieval" and "web search." To measure such similarity, an approach leveraging the member profiles, and specifically the co-occurrence of entities in these member profiles, is used. For example, if two skills tend to occur in similar groups of members, the two skills are likely to be related and may be considered a "soft match."

Thus, to complement a user query that may not be enough alone to represent a user's information need and interest, the idea of expertise homophile is exploited to capture the similarity between the searcher's expertise (as defined by skills) and job expertise requirements to make job search results more personally relevant.

In the social network, a node tends to be connected or interact with other nodes that are similar to it. In the context of a job search, in an example embodiment a job searcher tends to be interested in the jobs that require similar expertise as his or her skills. Members of a social network may be permitted to add skills to their profiles. These skills may be among thousands of standardized skills. Members can also endorse skills of other members in their network.

Figure 7:
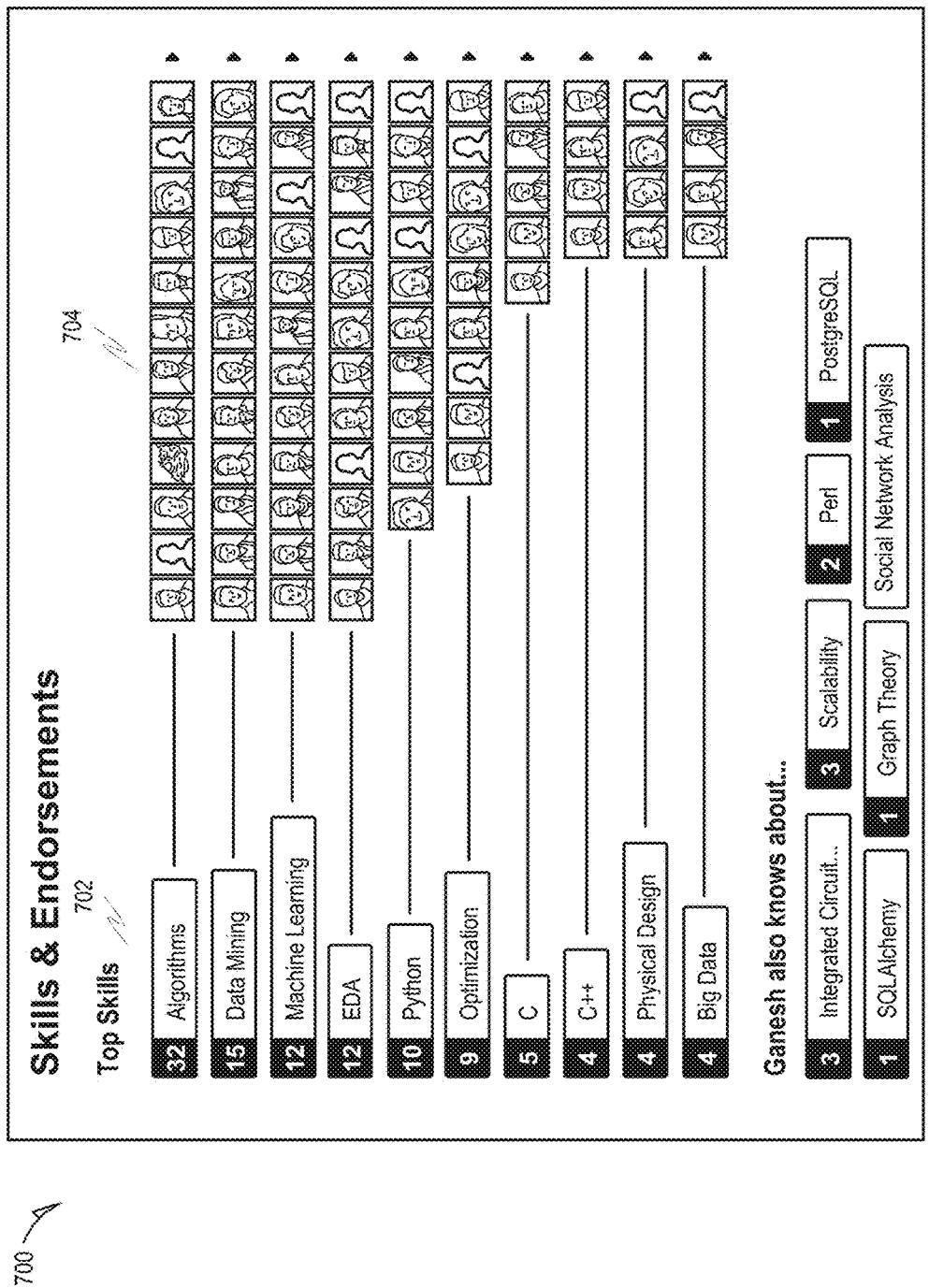
FIG. 7 is a screen capture illustrating an example skills and endorsements section of a member profile, in accordance with an example embodiment.

FIG. 7 is a screen capture illustrating an example skills and endorsements section 700 of a member profile, in accordance with an example embodiment. A list of the members skills 702 is presented, ranked in order based on the number of endorsements provided for those skills, and photos of members 704 who made the corresponding endorsements are also presented.

On the job posting document side, each job posting document includes a set of standardized skills.

A key challenge of generating the expertise homophily feature is that searchers may not explicitly list in the profiles all the skills they have. In an example embodiment, in order to overcome this challenge, a collaborative filtering technique is used to infer skills that the searchers might have. This collaborative filtering technique may be based on co-occurrence of skills in particular patterns from the member database. An initial member skill matrix is constructed in which a cell has a value of one if the corresponding member explicitly lists the corresponding skill. Otherwise, the cell takes an unknown skill. By nature this matrix is very sparse. The matrix is then factorized into member and skill matrices in a K-dimensional latent space, where K is a parameter that may be set to, for example, 50. The dot product of the matrices is computed to fill in the unknown cells. If the value of a cell is more than a certain threshold, then the corresponding member is considered to also know the corresponding skill.

The matrix factorization algorithm may infer what are termed "latent topics" among the skills based on co-occurrences of skills in member profiles. Each latent topic is a cluster of skills determined to be related to each other. For example, one latent topic could include a cluster of skills such as machine learning, data mining, and big data, which all have been observed to co-occur with each other in a frequency above a threshold frequency among members of the social network.

Figure 8:
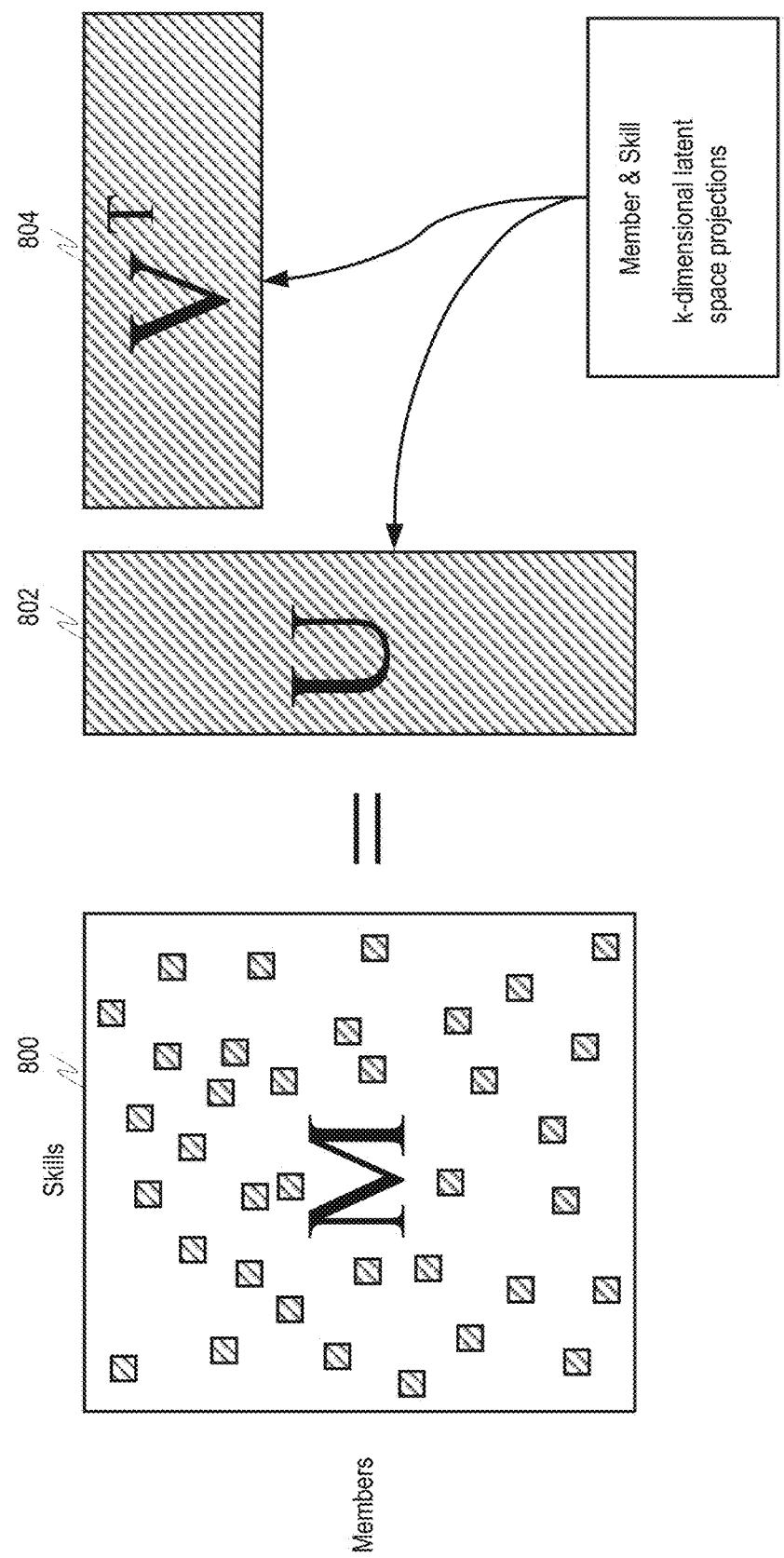
FIG. 8 is a diagram illustrating the members-skills matrix factorization, in accordance with an example embodiment.

The matrix factorization algorithm may begin with a members-skills matrix having members on one axis and skills on another axis, with a value of "1" assigned to each cell where the corresponding member has explicitly identified as having the corresponding skill, and a value of "unknown" or the like assigned to every other cell. The members-skills matrix is then factored into two matrices. FIG. 8 is a diagram illustrating the members-skills matrix factorization, in accordance with an example embodiment. The members-skills matrix 800 is factored into members matrix U 802 and skills matrix V 804, each being k-dimensional latent space projections. As can be seen, members-skills matrix 800 is sparse, while members matrix U 802 and skills matrix V 804 are both dense.

When factorizing the matrix, factors are sought that optimize a loss function as follows:

$$\min_{x_*, y_*} \sum_{m,s} c_{ms}(s_{ms} - x_m^T y_s)^2 + \lambda \left( \sum_m \|x_m\|^2 + \sum_s \|y_s\|^2 \right)$$

where the goal is to find a vector $x_m \in \mathbb{R}^k$ for each member m, and a vector $y_s \in \mathbb{R}^k$ for each skill s that will factor member-skill affinities. In other words, the values for the cells are assumed to be the inner products $s_{ms} = x_m^T y_s$. These vectors are referred to as member-factors and skill-factors, respectively. This formulation accounts for all member/skill pairs rather than only those which are known. The unknown values may be treated as zeroes with low confidence, and the known scores are treated as being high confidence values. The confidence function may be represented as follows:

$$c_{m,s} = \begin{cases} \alpha, & \text{if } s_{ms} > 0 \\ 1, & \text{otherwise} \end{cases}$$

The exact values for $\lambda$ (the regularization parameter), k (the size of the latest reduced-dimensionality space), and a (the high-confidence value for known skills) are determined by cross-validation on the reconstituted matrix.

Each row in the members matrix U 802 is a representation of a member in latest space. Specifically, each row corresponds to a different member and the values for the cells in the row represent the values assigned to the likelihood that the member has the skills in the corresponding latent topic grouping of skills. Thus, if k is, for example, set at 3, then each row in members matrix U 802 will have 3 cells, each one indicating the likelihood that the corresponding member has the skills in a different one of the three latent topic groupings.

Each column in the skills matrix V 804 is a representation of a skill in the latent space. Specifically, each column corresponds to a different skill and the values in the cells in the column represent the values assigned to the likelihood that the skill applies to the latent topic grouping. Thus, for example, the skill of Java may have a strong likelihood of applying to the latent topic grouping of object-oriented programming, and thus the corresponding cell would be assigned a greater value than the cell representing the skill of Java and the latent topic grouping of marketing, to which the skill of Java has little application.

In order to handle the computationally complex task of matrix factorization, in an example embodiment, a two-phase approach is applied. An offline process periodically runs on distributed computing platforms to infer member skills. The online phase then consumes the latest version of the data at ranking time. Given a set of skills that a searcher has and a set of skills that a job requires, a Jaccard similarity is computed between the two sets. In another example embodiment, weighted Jaccard similarity is used in which the weights are determined by how deeply the searcher knows the skills. These could be estimated from the dot product between the members matrix and the skills matrix.

The above features are then integrated into a job search ranking function. Specifically, a learning-to-rank approach is applied to learn a new ranking function that combines the entity-aware features with existing features.

Learning to rank, also known as machine-learned ranking, is an application of machine learning, typically supervised, semi-supervised, or reinforcement leaning. Training data comprises lists of items with some partial order specified between items in each list. This order is typically induced by giving numerical or ordinal score or a binary judgement for each item. The ranking model's purpose is to rank, e.g., produce a permutation of items in lists in a way which is similar to the rankings in the training data in some sense.

In an example embodiment, existing features are generally divided into three categories: textural features, geographic features, and social features. The most traditional type of features is textural features. These features match the keywords in queries with different sections of a job description.

Geographic features relate to the location of the searcher/job opening. Social features indicate how the results socially relate to the searcher, based on factors such as how the searcher socially connects with the company posting the job (e.g., if her or she follows the company or has friends working at the company).

A traditional way to obtain training data is to use human experts to label the results. However, given a large training data set for a personal search, it is expensive to use human experts. At the same time, it is very hard for people other than the searcher to know the true relevance of the results. For example, for the query of "software engineer," a new college graduate in the U.S. and an experienced candidate in Canada could be interested in very different results. In an example embodiment, log data is used as implicit feedback from searchers to generate training data. Log data comprises information about how users interact with results, such as which results they click on and which of the underlying jobs associated with the job postings they apply for.

Figure 9:
FIG. 9 is a diagram illustrating filtering of job posting results from training data, in accordance with an example embodiment.

One problem with log data is something known as "position bias," as users tend to interact with top results. Thus, labels inferred from user actions may be biased towards the ranking function generating the data. In order to counter the position bias, in an example embodiment, search results are randomized and shown to a small percentage of traffic. Additionally, log data may include not just information such as which documents the searcher clicked on but also which job positions the searcher applied for. Applying is a stronger signal of relevance than clicking, and thus a higher label may be assigned to applied results (considered as perfect results) and a lower label to clicked results (considered as good results). Results that received no interaction at all are considered as bad results, although for results shown below the last interacted one it cannot be determined whether the searcher deliberately did not interact with these results or whether the searcher did not look at them. In an example embodiment, results shown below the last result to be interacted with are discarded. FIG. 9 is a diagram illustrating filtering of job posting results from training data, in accordance with an example embodiment. As described above, the top results that have been applied for by a corresponding member, such as result 900, are considered perfect results. Top results that have not been applied for but have been clicked on, such as result 902, are considered good results. Results such as 904 and 906 that are higher than the lowest ranked interacted-with result (which here is result 900) but that themselves have not been interacted with are considered poor results, while any results below the lowest ranked interacted-with result (which here would include results 908 and 910) are simply ignored.

Figure 10:
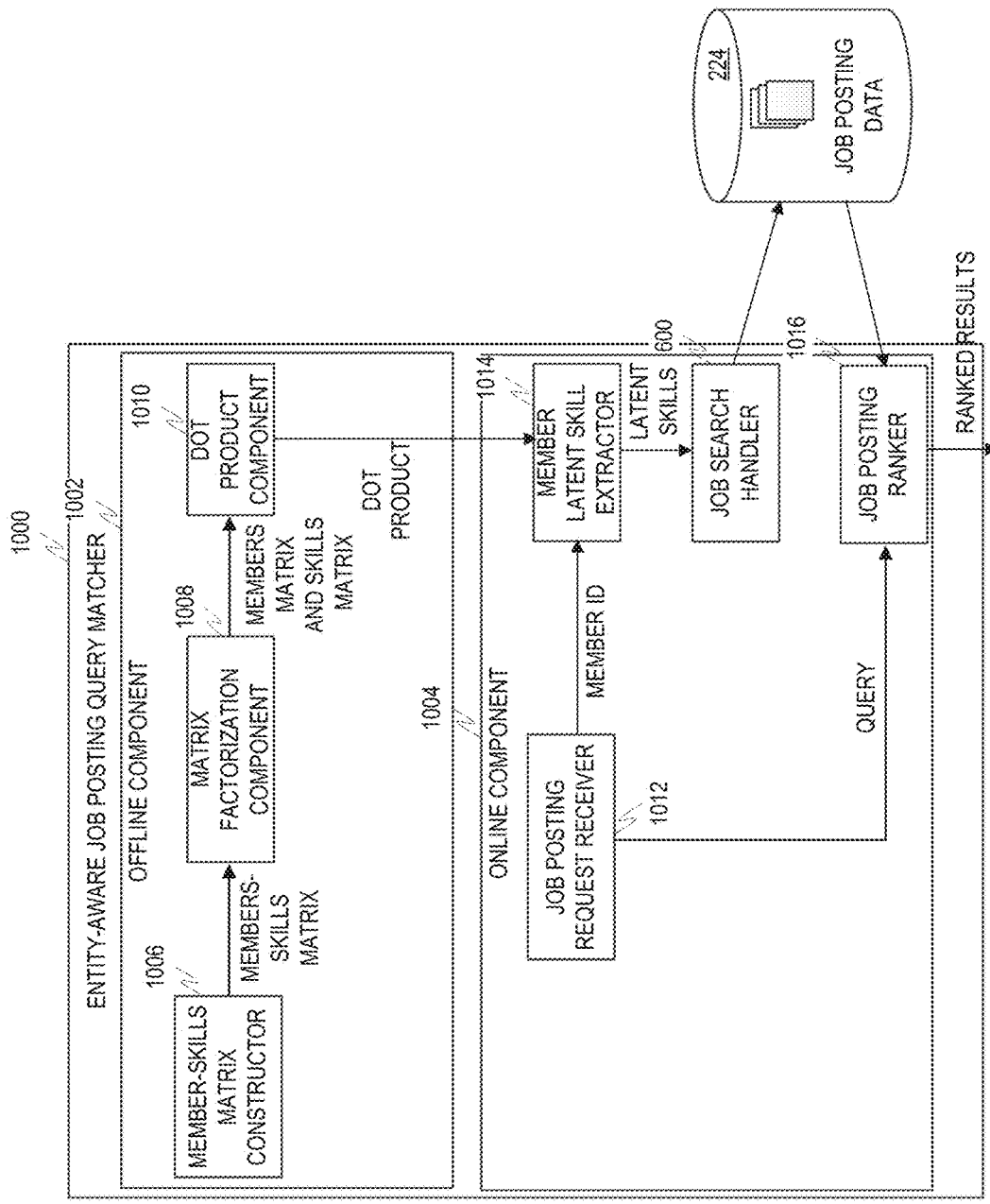
FIG. 10 is a block diagram illustrating an entity-aware job posting query matcher, in accordance with an example embodiment.

Given the training data set, Coordinate Ascent may be applied. Coordinate Ascent is a listwise learning-to-rank algorithm used to search for an optimal model. For efficiency purposes, linear models may be used. One key benefit of a listwise learning-to-rank approach over pointwise and pairwise approaches is that the listwise approach can optimize ranking-based metrics directly. An objective function optimized in the learning process may be normalized discounted accumulative gain defined on the graded relevance labels, as described above FIG. 10 is a block diagram illustrating an entity-aware job posting query matcher 1000, in accordance with an example embodiment. The entity-aware job posting query matcher 1000 may be located inside the application server module 214 of FIG. 2. The entity-aware job posting query matcher 1000 may include an offline component 1002 and an online component 1004. The offline component 1002 infers member skills and creates an output dot product of a members matrix and a skills matrix in an offline manner. In this embodiment, this means that the offline component 1002 performs its work independently of any interactions a member may have with the social networking service, such as performing a job posting query. Specifically, using historical member profiles, a members-skills matrix constructor 1006 constructs a members-skills matrix having a list of members on one axis and a list of possible skills on the other axis, with values in the matrix representing whether or not the corresponding member has explicitly indicated that they possess the corresponding skill. A matrix factorization component 1008 performs matrix factorization on the members-skills matrix to produce a members matrix and a skills matrix, each being k-dimensional latent space projections, as described in more detail above. A dot product component 1010 produces the dot product of the members matrix and the skills matrix.

At runtime, the online component 1004 uses this dot product of the members matrix and the skills matrix to infer one or more latent skills to a member for whom job posting results are being retrieved (possibly in response to a search query from the member). Specifically, the online component 1004 includes a job posting request receiver 1012, which receives a query for job postings that may be relevant to a particular member (as described above, the query may be sent from the member, although this is not strictly necessary). A member latent skill extractor 1014 then uses an identification of the member and the dot product of the members matrix and skills matrix to determine one or more latent skills for the particular member that the member has not explicitly indicated he or she has. This may be accomplished by using an identification for the member as a key for the dot product of the members matrix and skills matrix and finding any skills that have values that exceed a predetermined threshold but that are not equal to one (with one indicating that the member has explicitly indicated that they have the skill). A job search handler 600 may then perform a search using the query on data in the job posting database 224, which may result in job postings relevant to mapped entities from the search query. A job posting ranking component 1016 may then rank the returned job postings based at least in part on the latent skills identified for the particular member, as described in more detail above.

Figure 11:
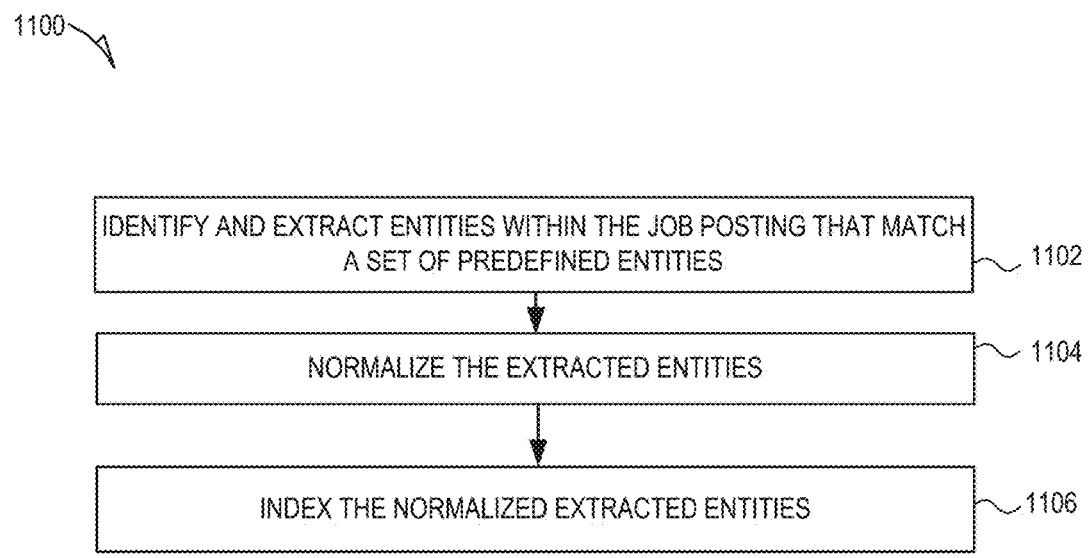
FIG. 11 is a flow diagram illustrating a method of indexing a job posting indexer, in accordance with an example embodiment.

FIG. 11 is a flow diagram illustrating a method 1100 of indexing a job posting indexer, in accordance with an example embodiment. At operation 1102, entities within the job posting that match a set of predefined entities are identified and extracted from the job posting. The predefined entities may be specified by an administrator. At operation 1104, the extracted entities are normalized so that entities that actually mean the same thing but are worded differently are treated the same. At operation 1106, the normalized extracted entities from the job posting are indexed.

Figure 12:
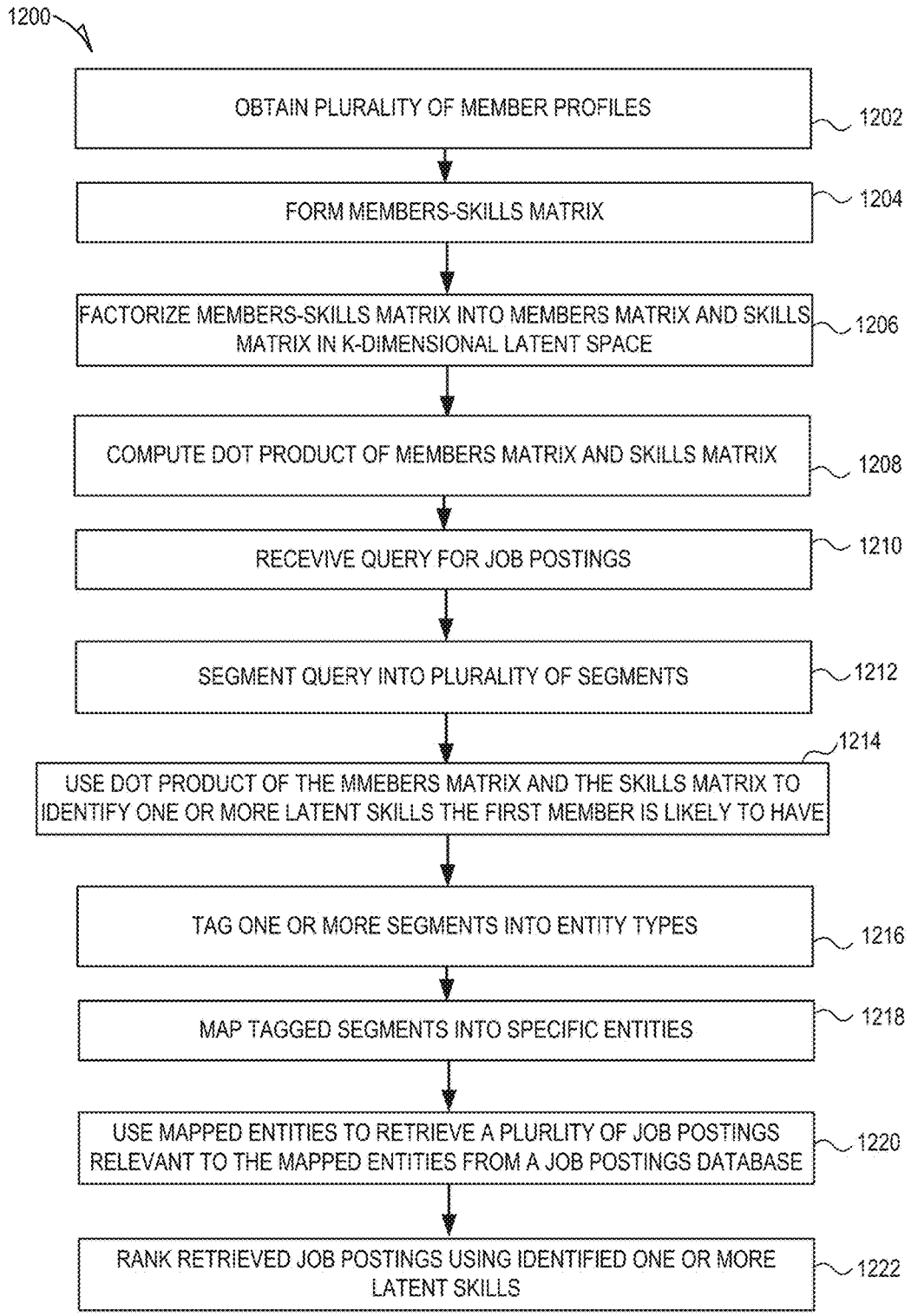
FIG. 12 is a flow diagram illustrating a method of performing an augmented job posting search, in accordance with an example embodiment.

FIG. 12 is a flow diagram illustrating a method 1200 of performing an augmented job posting search, in accordance with an example embodiment. At operation 1202, a plurality of member profiles in a social networking service are obtained, each member profile identifying a member and listing one or more skills that the corresponding member has explicitly added to the member profile, the one or more skills indicating a proficiency by the member in the corresponding skill. At operation 1204, a members-skills matrix is formed with members on one axis of the matrix and skills on another axis of the matrix, wherein each cell in the matrix is assigned a first value if the corresponding member explicitly lists the corresponding skill in the corresponding member profile and a second value if the corresponding member does not explicitly list the corresponding skill in the corresponding member profile.

At operation 1206, the members-skills matrix is factorized into a members matrix and a skills matrix in k-dimensional latent space. At operation 1208, the dot product of the members matrix and the skills matrix is computed. Operations 1202-1208 may be performed in an offline fashion, based on member profiles stored in the social networking service, and not necessarily when particular members are taking particular actions in the social networking service.

At operation 1210, a query for job postings is received. This query may be received directly from a member looking for a job, or may be received indirectly such as by a member browsing jobs and selecting one or more filters. Either way, this query is attempting to find job postings relevant to a first member of the social networking service. At operation 1214, the dot product of the members matrix and the skills matrix is used to identify one or more latent skills the first member is likely to have despite the first member not explicitly listing the one or more latent skills in a corresponding member profile. At operation 1212, the query is segmented into a plurality of segments. At operation 1216, one or more of the segments are tagged into entity types that are important to the job search domain. At operation 1218, the tagged segments are mapped into specific entities. This may either be soft matching or hard matching, as described earlier. At operation 1220, the mapped entities are used to retrieve a plurality of job postings relevant to the mapped entities from a job postings database.

At operation 1222, the retrieved job postings are ranked using the identified one or more latent skills.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
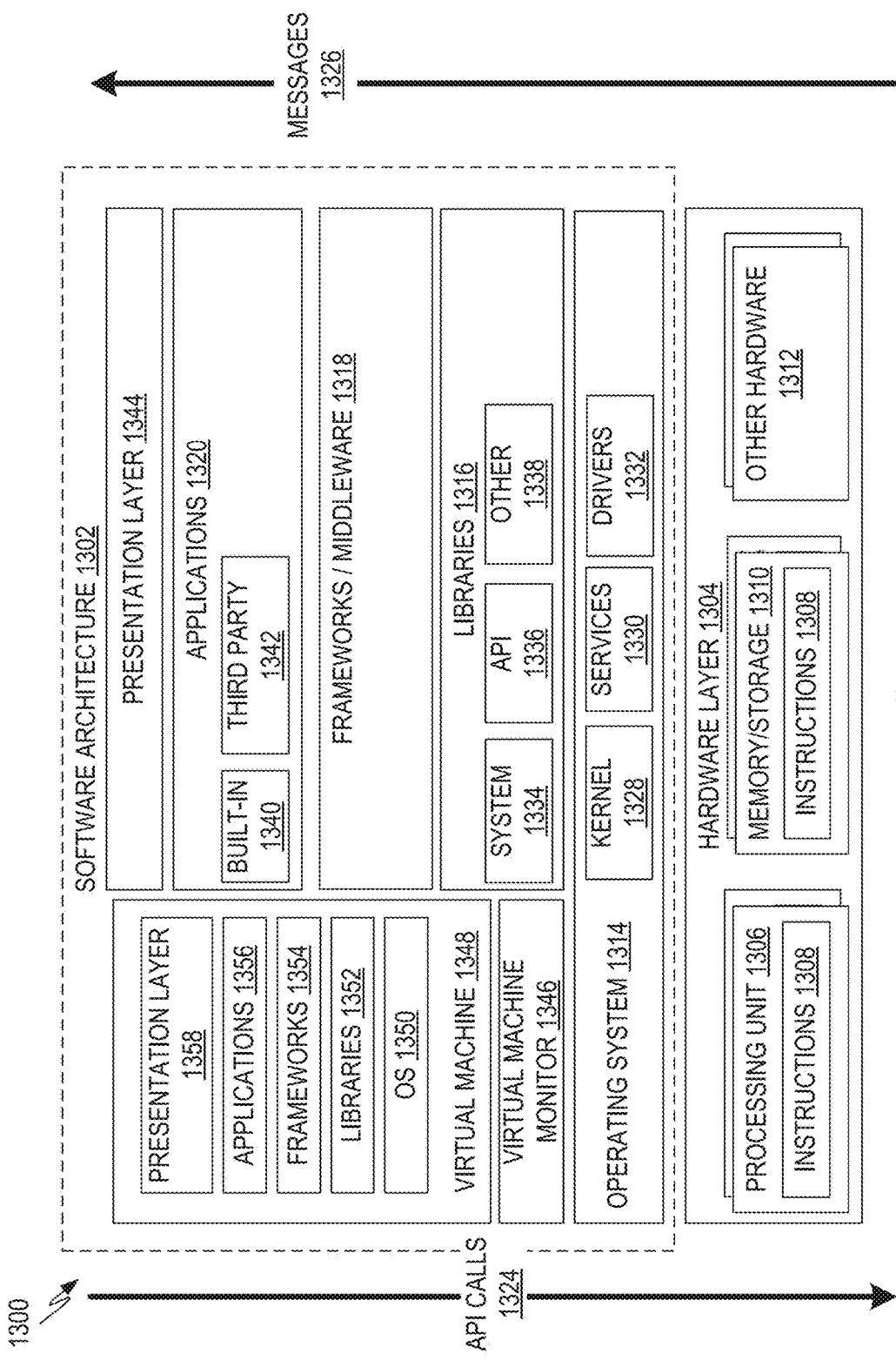
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive responses, returned values, and so forth, illustrated as messages 1326, in response to the API calls 1324. The layers illustrated are representative in nature and not all software architectures have all layers. For example, some mobile or special purpose operating systems may not provide a layer of frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system 1334 libraries (e.g., C standard library) that may provide functions such as memory allocation functions, string manipulation functions, mathematic functions, and the like. In addition, the libraries 1316 may include API 1336 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third party applications 1342. Examples of representative built-in applications 1340 may include, but are not limited to, a contacts application, a browser application, a book reader application, a location application, a media application, a messaging application, and/or a game application. The third party applications 1342 may include any of the built-in applications as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system, such as the operating system 1314, to facilitate functionality described herein.

The applications 1320 may utilize built-in operating system 1314 functions (e.g., kernel 1328, services 1330, and/or drivers 1332), libraries 1316 (e.g., system 1334, APIs 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). A virtual machine is hosted by a host operating system (e.g., operating system 1314 in FIG. 13) and typically, although not always, has a virtual machine monitor 1346, which manages the operation of the virtual machine as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
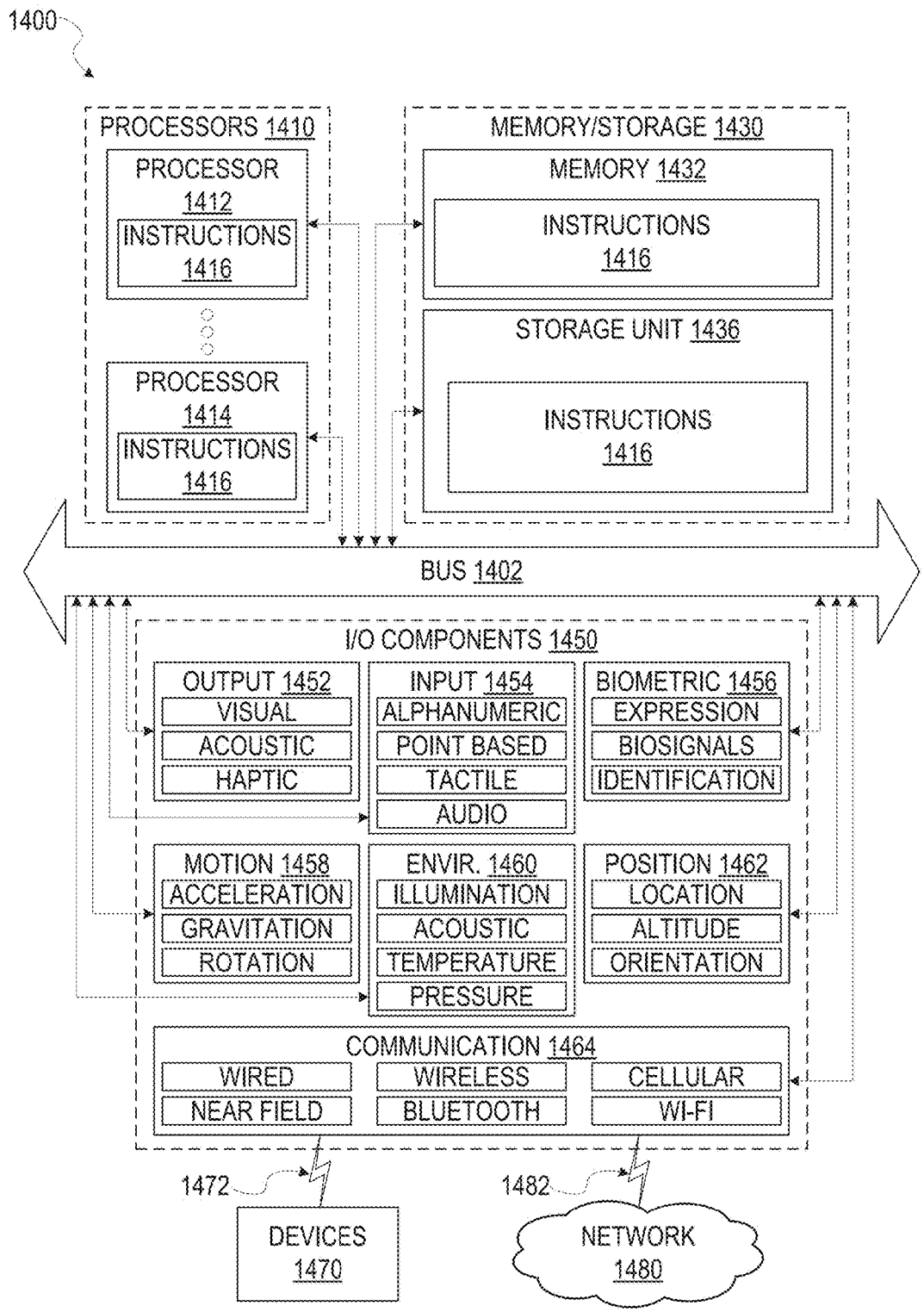
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method for automatically augmenting digitally stored member profiles with skills the members have not explicitly added to their member profiles, the method comprising:
    obtaining a plurality of member profiles in a social networking service, each member profile identifying a member and listing one or more skills the corresponding member has explicitly added to the member profile, the one or more skills indicating a proficiency by the member in the corresponding skill;
    forming a members-skills matrix, wherein each cell in the matrix is assigned a value based on whether the corresponding member has the corresponding skill;
    computing the dot product of the members matrix and the skills matrix;
    using the dot product to identify one or more latent skills of a first member of the social networking service;
    augmenting a first digitally stored member profile for the first member with the one or more latent skills by combining the one or more latent skills with explicit skills listed in the first digitally stored member profile for purposes of one or more searches that utilize member skills as an input variable; and
    returning results from the one or more searches, the results based on the explicit skills listed in the first digitally stored member profile and the one or more latent skills of the first member.

2. The method of claim 1, further comprising:
    receiving a request for one or more job postings relevant to a first member of the social networking service;
    using the dot product of the members matrix and the skills matrix to identify one or more latent skills the first member is likely to have despite the first member not explicitly listing the one or more latent skills in a corresponding member profile; and
    using the identified one or more latent skills to rank job postings relevant to the first member of the social networking service.

3. The method of claim 2, wherein the request includes a search term query from the member; and
    the one or more job postings relevant to the first member of the social networking service include job postings containing the one or more search terms.

4. The method of claim 3, wherein job postings are indexed in a job posting database using terms extracted from the job postings and assigned a plurality of different entity types.

5. The method of claim 4, further comprising:
    segmenting the search term query into a plurality of segments, wherein at least one of the plurality of segments is tagged as a first entity type and at least one of the plurality of segments is tagged as a second entity type; and
    wherein the tagged segments are used to retrieve relevant job postings from the job posting database by comparing the tagged segments to index terms of the same entity types.

6. The method of claim 1, wherein the members matrix includes, for each member in the members-skill matrix, a row containing values indicating a probability that the corresponding member has skills in a corresponding one of k latent topic groupings of skills.

7. The method of claim 1, wherein the skills matrix includes, for each skill in the members-skill matrix, a column containing values indicating a probability that the corresponding skill applies to a corresponding one of k latent topic groupings of skills.

8. A system comprising:
    a computer readable medium having instructions stored there on, which, when executed by a processor, cause the system to:
    obtain a plurality of member profiles in a social networking service, each member profile identifying a member and listing one or more skills the corresponding member has explicitly added to the member profile, the one or more skills indicating a proficiency by the member in the corresponding skill;
    form a members-skills matrix, wherein each cell in the matrix is assigned a value based on whether the corresponding member has the corresponding skill;
    compute the dot product of the members matrix and the skills matrix;
    compute the dot product of the members matrix and the skills matrix;
    use the dot product to identify one or more latent skills of a first member of the social networking service;
    augment a first digitally stored member profile for the first member with the one or more latent skills by combining the one or more latent skills with explicit skills listed in the first digitally, stored member profile for purposes of one or more searches that utilize member skills as an input variable; and
    return results from the one or more searches, the results based on the explicit skills listed in the first digitally stored member profile and the one or more latent skills of the first member.

9. The system of claim 8, wherein the computer readable medium further has instructions that cause the system to:
    receive a request for one or more job postings relevant to a first member of the social networking service;

use the dot product of the members matrix and the skills matrix to identify one or more latent skills the first member is likely to have despite the first member not explicitly listing the one or more latent skills in a corresponding member profile; and use the identified one or more latent skills to rank job postings relevant to the first member of the social networking service.

10. The system of claim 9, wherein the request includes a search term query from the member; and the one or more job postings relevant to the first member of the social networking service include job postings containing the one or more search terms.

11. The system of claim 10, wherein job postings are indexed in a job posting database using terms extracted from the job postings and assigned a plurality of different entity types.

12. The system of claim 11, wherein the computer readable medium further has instructions that cause the system to:

segment the search term query into a plurality of segments, wherein at least one of the plurality of segments is tagged as a first entity type and at least one of the plurality of segments is tagged as a second entity type; and wherein the tagged segments are used to retrieve relevant job postings from the job posting database by comparing the tagged segments to index terms of the same entity types.

13. The system of claim 8, wherein the members matrix includes, for each member in the members-skill matrix, a row containing values indicating a probability that the corresponding member has skills in a corresponding one of k latent topic groupings of skills.

14. The system of claim 8, wherein the skills matrix includes, for each skill in the members-skill matrix, a column containing values indicating a probability that the corresponding skill applies to a corresponding one of k latent topic groupings of skills.

15. A non-transitory machine-readable storage medium comprising instructions, which when implemented by one or more machines, cause the one or more machines to perform operations comprising:

obtaining a plurality of member profiles in a social networking service, each member profile identifying a member and listing one or more skills the corresponding member has explicitly added to the member profile, the one or more skills indicating a proficiency by the member in the corresponding skill;

forming a members-skills matrix, wherein each cell in the matrix is assigned a value based on whether the corresponding member has the corresponding skill;

computing the dot product of the members matrix and the skills matrix;

computing the dot product of the members matrix and the skills matrix;

using the dot product to identify one or more latent skills of a first member of the social networking service;

augmenting a first digitally stored member profile for the first member with the one or more latent skills by combining the one or more latent skills with explicit skills listed in the first digitally stored member profile for purposes of one or more searches that utilize member skills as an input variable; and returning results from the one or more searches, the results based on the explicit skills listed in the first digitally stored member profile and the one or more latent skills of the first member.

16. The non-transitory machine-readable storage medium of claim 15, further comprising:

receiving a request for one or more job postings relevant to a first member of the social networking service;

using the dot product of the members matrix and the skills matrix to identify one or more latent skills the first member is likely to have despite the first member not explicitly listing the one or more latent skills in a corresponding member profile; and using the identified one or more latent skills to rank job postings relevant to the first member of the social networking service.

17. The non-transitory machine-readable storage medium of claim 16, wherein the request includes a search term query from the member; and the one or more job postings relevant to the first member of the social networking service include job postings containing the one or more search terms.

18. The non-transitory machine-readable storage medium of claim 17, wherein job postings are indexed in a job posting database using terms extracted from the job postings and assigned a plurality of different entity types.

19. The non-transitory machine-readable storage medium of claim 18, further comprising:

segmenting the search term query into a plurality of segments, wherein at least one of the plurality of segments is tagged as a first entity type and at least one of the plurality of segments is tagged as a second entity type; and wherein the tagged segments are used to retrieve relevant job postings from the job posting database by comparing the tagged segments to index terms of the same entity types.

20. The non-transitory machine-readable storage medium of claim 15, wherein the members matrix includes, for each member in the members-skill matrix, a row containing values indicating a probability that the corresponding member has skills in a corresponding one of k latent topic groupings of skills.

* * * * *